United States Patent Office 2,745,761
Patented May 15, 1956

2,745,761
COOKED LAUNDRY STARCH

Bud J. Peter, Santa Rosa, Calif., assignor, by mesne assignments, to American Tansul Company, San Francisco, Calif., a corporation of California No Drawing. Application July 13, 1953,
Serial No. 367,777

3 Claims. (Cl. 106—214)

This invention relates to new and useful improvements in starch products. More particularly, the invention relates to the addition of a small quantity of the mineral hectorite to corn starch to produce an improved laundry starch. Reference is made to my co-pending application Ser. No. 314,940, filed October 15, 1952, for Starch Product.

One of the primary problems in the use of starch is the necessity of lubricating the garments to prevent sticking of the starched clothing and cloth to the various pieces of laundry equipment, such as presses, flat work ironers, mangles, etc. Heretofore, a number of products have been used as starch additives, including sulfonated castor oil, japan wax, beeswax, emulsions of petroleum oils, glycerine compounds, glycols, and other materials. Such materials have generally been oily or waxy and for that reason undesirable. In addition, the cost of the additives to starch has increased the price of such starches. The instant invention involves the use of an additive which does not increase the price of the starch, is not oily or waxy, and which reduces the amount of starch needed to treat a given quantity of garments.

The starches used in commercial laundries have generally been highly purified, specially prepared substances of the nature of corn starch, wheat starch, rice starch, etc. Common quality corn starch has not heretofore been suitable for use in laundries, for the reason that when it is cooked it becomes very thick and viscous and will not penetrate the layers of cloth properly and will stick to the presses excessively. These disadvantages have heretofore prevented the use of the cheapest source for a bodying and stiffening agent normally considered in laundries.

The instant invention involves the addition of a small percentage of the mineral hectorite to common quality corn starch. The percentage of hectorite is approximately 3½% by weight to 96½% powdered corn starch.

More particularly, the mineral hectorite of the variety which occurs naturally in the vicinity of Daggett, California, is desirable. This mineral has approximately the following chemical composition:

| | Per cent |
|---|---|
| Silica ($SiO_2$) | 53.68 |
| Alumina ($Al_2O_3$) | .60 |
| Lime (CaO) | .52 |
| Magnesia (MgO) | 25.34 |
| Sodium oxide ($Na_2O$) | 3.00 |
| Potassium oxide ($K_2O$) | .07 |
| Water ($H_2O$) | 15.52 |
| Chlorine (Cl) | .31 |
| Lithium (Li) | [1] 1.00 |

[1] Approximately.

The mineral hectorite is a natural hydrophilic hydrated magnesium silicate. The invention utilizes the film-forming, lubricating and thickening properties of this mineral which are not secured by employing other clays such as Wyoming bentonites. Further, ordinary bentonites contain so much impurity that they are not satisfactory from a practical standpoint since they discolor the fabrics starched. The mineral which has been heretofore described is white and completely dispersable and hence has vastly improved properties over related clays.

The use of the present invention affords a number of advantages. The starch preparation penetrates the fibers and produces a smooth, fine finish. In addition the garments do not tend to stick to the hot metallic surfaces of presses or irons. When several layers of fabric are incorporated in a garment, the layers of fabric do not tend to stick together. Another advantage of the invention is a material reduction in the amount of starch required to prepare a paste of the proper body.

Still another advantage of the invention is that finished garments which are treated with starch prepared in accordance with this invention hold their stiffness for a longer period of time even under humid conditions. No oil or wax need be incorporated into the starch mixture and less expensive grades of starch may be used. Fabrics which cannot be presently starched with conventional mixtures can now be treated. The stiffness of the fabric endures longer, layers of cloth do not adhere to each other, and flat pieces may be ironed without sticking to the iron and without using a leader. Thus, labor in the laundry is reduced, and an improved gloss is achieved.

The present invention involves the addition of approximately 3½% of the mineral hectorite, which has heretofore been described, to approximately 96½% common corn starch. The mixing of the hectorite and starch may be accomplished either in dry or in wet state.

When the starch and mineral are mixed dry, the hectorite is first ground to a fine powder and then mechanically mixed with dry powdered corn starch. The percentages of the ingredients to be mixed are chosen to produce the end proportions.

The starch and hectorite may also be mixed in liquid state. Thus, a slurry of hectorite is prepared and is added to wet starch prior to the final drying step in the manufacture of starch. The proportions of hectorite and starch which are mixed together are such as to produce the ratio of 3½% dry weight of hectorite to 96½% dry weight of corn starch. The wet mixture of starch and hectorite is dried by simple drying means such as is commonly employed in the drying of corn starch. The dried product is then ground to produce the laundry starch.

In the laundry the mixture of corn starch and additive may be used dry. When so used the powdered mixture is added dry to the laundry wheel during the last rinse of the garments and the wheel is allowed to run for approximately ten minutes. When the water is removed, there is sufficient mixing action between the garments and the starch product so that a nice, smooth finish results, and the garments do not stick to the presses or irons.

Instead of being used dry, the starch and hectorite mixture may be used cooked. In ordinary starch preparations, approximately 6 to 8 ounces of dry starch per gallon of water are used and this is cooked from ten to thirty minutes. The resulting starch base becomes thick and viscous and does not penetrate the layers of fabric properly. In accordance with the instant invention less than the normal amount of starch is employed. Thus, if 4 ounces of starch and hectorite mixture is employed per gallon of water and cooked for ten to thirty minutes a very even, smooth starch paste is formed. When this starch paste is added to the garments, it penetrates and is not excessively thick. When garments so treated are pressed on flat-work irons or in presses it has been found that the starch preparation has penetrated the fibers and produced a fine, smooth finish with none of the attendant sticking problems which would normally occur, were the starch used without the hectorite.

Although I have described my invention in some detail

What is claimed is:

1. A laundry product comprising a mixture of hectorite and corn starch in the proportion of approximately 3½% to 96½%.

2. A cooked laundry starch comprising of a mixture of approximately 3½% hectorite and approximately 96½% corn starch and water, the proportion of solid to water being approximately 4 ounces per gallon.

3. A method of preparing cooked laundry starch comprising preparing a mixture of approximately 3½% ground hectorite and 96½% corn starch, adding said mixture to water in the proportion of 4 ounces solid to one gallon water and cooking for 20 to 30 minutes.

References Cited in the file of this patent

UNITED STATES PATENTS

| | | |
|---|---|---|
| 1,498,269 | Harris | June 17, 1924 |
| 1,863,731 | Schorger | June 21, 1932 |
| 2,212,557 | Bauer | Aug. 27, 1940 |
| 2,235,676 | Gardner | Mar. 18, 1941 |